Patented Dec. 20, 1938

2,140,717

UNITED STATES PATENT OFFICE 2,140,717

GLUCOSIDE OF 3,3' - DIAMINO - 4,4' - DIHYDROXY ARSENOBENZENE-SODIUM FORMALDEHYDE SULPHOXALATE AND A PROCESS OF MAKING IT

Frank Lee Pyman, Bertram Garforth, and Leonard Anderson, Nottingham, England, assignors to Boots' Pure Drug Company Limited, Nottingham, England, a British company No Drawing. Application January 27, 1936, Serial No. 61,114. In Great Britain February 16, 1935

14 Claims. (Cl. 260—211)

This invention relates to the production of organic derivatives of arsenic suitable for therapeutic use and has special reference to the production of derivatives of 3,3'-diamino-4,4'-dihydroxyarsenobenzene.

For certain therapeutic uses, organic arsenic compounds should be soluble in water and of such a character that no precipitation occurs when a solution is injected into the blood stream, while the solution should be comparatively non-toxic and non-irritant in its effect on the animal organism and at the same time it should cause rapid and powerful destruction of spirochaetes.

The present invention is concerned with the preparation of an organic arsenic compound possessing in a high degree all the foregoing properties and which besides can be preserved in the absence of air for a very long time without undergoing any decomposition which will bring about any considerable alteration in these properties. It is already known that the compound of glucose and 3,3'-diamino-4,4'-dihydroxyarsenobenzene prepared according to the methods set forth in the specification of United States Patent No. 1,612,598 issued December 28, 1926 possesses to a considerable degree all the aforementioned properties, whether it is isolated as a solid substance or kept in solution as already described in the above specification.

The object of the present invention is to produce from a solution of the glucoside of 3,3'-diamino-4,4'-dihydroxyarsenobenzene, a new product which is much more stable than the original solution and which has, at the same time, considerably improved therapeutic properties.

It has been found that the addition of successive quantities of sodium formaldehyde sulphoxylate up to an amount corresponding to the addition of 1 molecular weight of the salt to 1 molecular weight of arsphenamine to the aqueous solution in glucose of the above-mentioned glucoside of arsphenamine has the effect of very considerably lowering the minimum curative dose (M. C. D.) as measured by the methods recognized by the licensing authority in Great Britain of the Therapeutic Substances Regulations (1931) for this type of compound, while the median lethal dose (L. D. 50) (Proceedings of the Royal Society, Series B, 1927, volume 101, page 483) is only slightly affected so that the therapeutic ratio $$\left(\text{i. e., } \frac{\text{L. D. 50}}{\text{M. C. D.}}\right)$$

is considerably increased.

It has been found that the increase in the therapeutic ratio attains a maximum when about 1 molecule of the salt has been added for every 2 molecules of the arsenic compound but nevertheless the amount of sodium salt may be varied within wide limits while still appreciably increasing the therapeutic ratio of the solution above that of the original solution.

The stability of the solution of the arsphenamine glucoside at low temperature is also considerably increased by the addition of sodium formaldehyde sulphoxylate but owing to decomposition of the solution when it is kept at an elevated temperature such as is experienced in tropical countries, it is not very suitable for general therapeutic use.

It has been found, however, that a product can be obtained from the above-mentioned highly active solution by suitable means, such as precipitation by means of alcohol, which product may be kept for a very long time under suitable conditions and that, when it is redissolved in water, it still retains the very high therapeutic ratio of the original solution.

According to the present invention, a solution obtained by adding sodium formaldehyde sulphoxylate to a solution of the glucoside of arsphenamine in an aqueous solution of glucose is treated, for example, with alcohol to precipitate the desired derivative in the form of a yellow powder. The powder contains an amount of sulphur equal to that in the sodium formaldehyde sulphoxylate but the manner of combination of the salt with the arsenic compound is not known with certainty. The active principle does not give, when dissolved in water, an immediate precipitate when treated with acid such as is given by neoarsphenamine. The product made according to the invention may be preserved in hermetically sealed vessels out of contact with oxygen and it retains its increased therapeutic efficiency even after very prolonged exposure to an elevated temperature. Thus, the therapeutic ratio of the product when freshly made is found to be about 45, while after being kept in an incubator at a temperature of 37° C. during six months, the therapeutic ratio is found to be about 40 which is very satisfactory when it is remembered that the minimum therapeutic ratio which is allowed by the said licensing authority under the Therapeutic Substances Regulations 1931 for neoarsphenamine is about 17.

In order that the invention may be clearly understood and readily carried into effect, an example of a method of preparing the new product in accordance with the present invention will now be described in greater detail and it will be understood that in the course of the operations set out in the following example, the usual precautions are taken for the exclusion of oxygen.

10 parts (in grammes) of 3,3'-diamino-4,4'-dihydroxyarsenobenzene are dissolved in 14 parts (in millilitres) of 4-normal caustic soda solution and 100 parts (in millilitres) of about 50 per cent glucose solution. The whole is thoroughly mixed and allowed to stand so as to react for approximately 16 hours until combination is complete. The solution is then neutralized with concentrated hydrochloric acid to a pH value of from 6 to 7. By titrating this solution with iodine the concentration of the base in the form of glucoside is determined and a quantity of sodium formaldehyde sulphoxylate dihydrate corresponding to the amount of 3,3'-diamino-4,4-dihydroxyarsenobenzene calculated from the above determination and amounting in the present case to about 2.1 parts (in grammes) is added in the solid form and the mixture is stirred until the solid is completely dissolved; the solution is allowed to stand for about 24 hours to complete the reaction. The solution is then filtered and the hydrogen ion concentration is then re-adjusted, if necessary, to a value of from 6 to 7. Without further delay, the clear filtrate is allowed to run slowly into 10 times its volume of 99 per cent alcohol, which is vigorously stirred during the addition of the solution. The alcohol may be warmed to a temperature of about 45 to 53° C. before the addition of the solution as a rather more easily filtrable precipitate is then obtained. The precipitate is separated by filtration and washed with absolute alcohol and finally with an anhydrous ether. The adherent solvent is removed by drying in a vacuum over dehydrating agents such as sulphuric acid and phosphorus pentoxide. The resulting powder is stored in hermetically sealed vessels from which all oxygen is removed.

Although a particular example is described above, the solution of the glucoside of 3,3'-diamino-4,4'-dihydroxyarsenobenzene to be used in carrying out the present invention may be made by any convenient method and in particular by any of the methods set forth in United States patent specification No. 1,612,598 issued December 28, 1926 already mentioned. It is also found that the same results are obtained by adding the sodium formaldehyde sulphoxylate in the commercial form or after recrystallization.

We claim:—

1. A process for the manufacture of a neutral, water-soluble derivative of 3,3'-diamino-4,4'-dihydroxyarsenobenzene which consists in adding sodium formaldehyde sulphoxylate to a premade, true solution of the glucoside of 3,3'-diamino-4,4'-dihydroxyarsenobenzene and precipitating the desired derivative from the resulting solution by admixing the solution with a water miscible inert fluid capable of decreasing the solubility of the desired derivative therein.

2. A process for the manufacture of a neutral, water-soluble derivative of 3,3'-diamino-4,4'-dihydroxyarsenobenzene which consists in adding sodium formaldehyde sulphoxylate in the solid form to a premade, true solution of the glucoside of 3,3'-diamino-4,4'-dihydroxyarsenobenzene in an aqueous glucose solution, stirring the mixture until the added solid is completely dissolved and precipitating the desired derivative from the resulting solution by admixing the solution with a water miscible inert fluid capable of decreasing the solubility of the desired derivative therein.

3. A process for the manufacture of a neutral, water-soluble derivative of 3,3'-diamino-4,4'-dihydroxyarsenobenzene which consists in adding sodium formaldehyde sulphoxylate to a premade, true solution of the glucoside of 3,3'-diamino-4,4'-dihydroxyarsenobenzene in an aqueous glucose solution, allowing the mixture to stand until the reaction is completed and precipitating the desired derivative from the resulting solution by admixing the solution with a water miscible inert fluid capable of decreasing the solubility of the desired derivative therein.

4. A process for the manufacture of a neutral, water-soluble derivative of 3,3'-diamino-4,4'-dihydroxyarsenobenzene which consists in adding sodium formaldehyde sulphoxylate to a premade, true solution of the glucoside of 3,3'-diamino-4,4'-dihydroxyarsenobenzene in an aqueous glucose solution in an amount of about one molecule of sodium formaldehyde sulphoxylate to two molecules of said arsenic compound and precipitating the desired derivative from the resulting solution by admixing the solution with a water miscible inert fluid capable of decreasing the solubility of the desired derivative therein.

5. A process for the manufacture of a neutral water-soluble derivative of 3,3'-diamino-4,4'-dihydroxyarsenobenzene which consists in reacting upon the 3,3'-diamino-4,4'-dihydroxyarsenobenzene with an aqueous solution of glucose in the presence of an alkali, allowing the mixture to stand until the reaction is completed to give a true solution of the glucoside, neutralizing the mixture, adding sodium formaldehyde sulphoxylate to the resulting solution of the glucoside and precipitating the desired derivative from the resulting solution by admixing the solution with a water miscible inert fluid capable of decreasing the solubility of the desired derivative therein.

6. A process for the manufacture of a neutral, water-soluble derivative of 3,3'-diamino-4,4'-dihydroxyarsenobenzene which consists in reacting upon the 3,3'-diamino-4,4'-dihydroxyarsenobenzene with an aqueous solution of glucose in the presence of an alkali, allowing the mixture to stand until the reaction is completed to give a true solution of the glucoside, neutralizing the mixture, adding sodium formaldehyde sulphoxylate to the resulting solution of the glucoside, allowing the mixture to stand until the further reaction is completed and precipitating the desired derivative from the resulting solution by admixing the solution with a water miscible inert fluid capable of decreasing the solubility of the desired derivative therein.

7. A process for the manufacture of a neutral, water-soluble derivative of 3,3'-diamino-4,4'-dihydroxyarsenobenzene which consists in adding sodium formaldehyde sulphoxylate to a premade, true solution of the glucoside of 3,3'-diamino-4,4'-dihydroxyarsenobenzene and precipitating the desired derivative from the resulting solution by pouring the latter into a large volume of alcohol.

8. A process for the manufacture of a neutral, water-soluble derivative of 3,3'-diamino-4,4'-dihydroxyarsenobenzene which consists in adding sodium formaldehyde sulphoxylate to a solution of the glucoside of 3,3'-diamino-4,4'-dihydroxyarsenobenzene in an aqueous glucose solution, allowing the mixture to stand until the reaction is completed and precipitating the desired derivative from the resulting solution by pouring the latter into a large volume of alcohol.

9. A process for the manufacture of a neutral, water-soluble derivative of 3,3'-diamino-4,4'-dihydroxyarsenobenzene which consists in reacting upon the 3,3'-diamino-4,4'-dihydroxyarsenobenzene with an aqueous solution of glucose in the presence of an alkali, allowing the mixture to stand until the reaction is completed to give a true solution of the glucoside, neutralizing the mixture, adding sodium formaldehyde sulphoxylate to the resulting solution of the glucoside and precipitating the desired derivative from the resulting solution by pouring the latter into a large volume of alcohol.

10. A process for the manufacture of a neutral, water-soluble derivative of 3,3'-diamino-4,4'-dihydroxyarsenobenzene which consists in reacting upon the 3,3'-diamino-4,4'-dihydroxyarsenobenzene with an aqueous solution of glucose in the presence of an alkali, allowing the mixture to stand until the reaction is completed to give a true solution of the glucoside, neutralizing the mixture, adding sodium formaldehyde sulphoxylate to the resulting solution of the glucoside, allowing the mixture to stand until the further reaction is completed and precipitating the desired derivative from the resulting solution by pouring the latter into a large volume of alcohol.

11. A process for the manufacture of a neutral, water-soluble derivative of 3,3'-diamino-4,4'-dihydroxyarsenobenzene which consists in dissolving the 3,3'-diamino-4,4'-dihydroxyarsenobenzene in 4-normal caustic soda and about 50 per cent glucose solution in the proportion of 10 grammes of said arsenic compound to 14 cubic centimeters of the caustic soda and 100 cubic centimeters of the glucose solution; thoroughly mixing said ingredients, allowing same to stand until the reaction is completed to give a true solution of the glucoside, adding concentrated hydrochloric acid to the solution to adjust the pH value of same to a value of from 6 to 7, adding solid sodium formaldehyde sulphoxylate dihydrate to the resulting solution in the proportion of 2.1 grammes of said compound to the above amounts of the other ingredients above-mentioned, stirring the mixture until the solid is completely dissolved, allowing the solution to stand until the further reaction is completed and precipitating the desired derivative from the resulting solution by pouring the latter into a large volume of alcohol.

12. A product in the form of a solid powder consisting of sodium formaldehyde sulphoxylate combined with a glucoside of 3,3'-diamino-4,4'-dihydroxyarsenobenzene in the proportion of approximately one molecule of said salt to two molecules of the 3,3'-diamino-4,4'-dihydroxyarsenobenzene, said powder being a neutral compound, and readily soluble in water.

13. A neutral, water-soluble derivative of 3,3'-diamino-4,4'-dihydroxyarsenobenzene obtained by treating a premade, true solution of the glucoside of said arsenic compound with sodium formaldehyde sulphoxylate.

14. As a new composition of matter, a sulphur-containing derivative of the glucoside of 3,3'-diamino-4,4'-dihydroxyarsenobenzene in which the sulphur is present in the ratio of about 1 atom of sulphur to 4 atoms of arsenic.

FRANK LEE PYMAN.
BERTRAM GARFORTH.
LEONARD ANDERSON.